United States Patent
Yang

(10) Patent No.: US 12,549,029 B2
(45) Date of Patent: *Feb. 10, 2026

(54) CHARGER CIRCUIT WITH THERMAL REGULATION CIRCUIT

(71) Applicant: ELITE SEMICONDUCTOR MICROELECTRONICS TECHNOLOGY INC., Hsinchu (TW)

(72) Inventor: Yao-Wei Yang, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 628 days.

This patent is subject to a terminal disclaimer.

(21) Appl. No.: 18/073,593

(22) Filed: Dec. 2, 2022

(65) Prior Publication Data

US 2024/0186813 A1    Jun. 6, 2024

(51) Int. Cl.
*H02J 7/00*    (2006.01)
(52) U.S. Cl.
CPC .... *H02J 7/007192* (2020.01); *H02J 7/00309* (2020.01); *H02J 7/0047* (2013.01)
(58) Field of Classification Search
CPC ................................. H02J 7/007192
USPC ........................................ 320/153
See application file for complete search history.

(56) References Cited

U.S. PATENT DOCUMENTS

| | | | | |
|---|---|---|---|---|
| 5,444,378 A | * | 8/1995 | Rogers | G01R 31/3832 320/136 |
| 12,166,372 B2 | * | 12/2024 | Yang | H02J 7/007192 |
| 2014/0266015 A1 | * | 9/2014 | Newlin | H02J 7/007192 320/153 |
| 2021/0218263 A1 | * | 7/2021 | Sun | H01M 10/443 |

FOREIGN PATENT DOCUMENTS

| | | |
|---|---|---|
| CN | 102148520 A | 8/2011 |
| CN | 102412611 A | 4/2012 |
| CN | 105207323 A | 12/2015 |
| TW | 200944989 A | 11/2009 |

* cited by examiner

*Primary Examiner* — Yalkew Fantu

(57) ABSTRACT

A charger circuit comprises a constant current charging circuit and a thermal regulation circuit. The constant current charging circuit is configured for generating a charging current, including a charger input terminal for receiving an input voltage, a charge current setting terminal, a charger output terminal for outputting the charging current, a current mirror including a reference current path between the charger input terminal and charge current setting terminal and an output current path between the charger input terminal and charger output terminal, and a feedback amplifier having a positive terminal, a negative terminal for receiving a feedback reference voltage, and a feedback output terminal coupled to the current mirror. The thermal regulation circuit is configured for generating and modulating a thermal regulation voltage with temperature, and outputting the thermal regulation voltage across the positive terminal of the feedback amplifier and the charging current setting terminal.

11 Claims, 5 Drawing Sheets

CHARGER CIRCUIT WITH THERMAL REGULATION CIRCUIT

BACKGROUND OF THE INVENTION

1. Field of the Invention

The present disclosure relates to a charger circuit, and in particular to a charger circuit with thermal regulation.

2. Description of the Related Art

A charger circuit, such as a linear charger, generally includes a constant current charging circuit and a constant voltage charging circuit. The linear charger can charge a battery in a constant current mode by using the constant current charging circuit, and may charge the battery in a constant voltage mode by using the constant voltage charging circuit. When the charging current for charging the battery becomes larger, the ambient temperature of the chip of the linear charger will increase, which may cause damage to the chip of the linear charger. A thermal regulation circuit may be coupled to the constant current charging circuit to control the temperature of the chip so as to prevent the chip from being damaged due to the high temperature.

A typical thermal regulation circuit may modulate one of the voltages at a negative terminal or a positive terminal of an amplifier in the constant current charging circuit through a zero-temperature coefficient reference voltage of the linear charger and a temperature sensing voltage of the linear charger, wherein a setting resistor for setting the charging current is coupled to the positive terminal of the amplifier.

However, different issues occur with the above configurations for modulating voltages for the thermal regulation circuits. In configurations where the voltage of the positive terminal of the amplifier is modulated according to temperature, a shutdown temperature of the linear charger may change with different values of the setting resistor. In other configurations where the voltage of the negative terminal of the amplifier is modulated according to temperature, the power stage of the linear charger may not be turned off at higher temperatures.

BRIEF SUMMARY OF THE INVENTION

An objective of the present disclosure is to provide a charger circuit with thermal regulation in order to have a stable shutdown temperature.

To achieve at least the above objective, the present disclosure provides a charger circuit. The charger circuit comprises a constant current charging circuit and a thermal regulation circuit. The constant current charging circuit is configured for generating a charging current, including a charger input terminal for receiving an input voltage, a charge current setting terminal, a charger output terminal for outputting the charging current, a current mirror including a reference current path between the charger input terminal and the charge current setting terminal and including an output current path between the charger input terminal and the charger output terminal, and a feedback amplifier having a positive terminal, a negative terminal for receiving a feedback reference voltage, and a feedback output terminal coupled to the current mirror. The thermal regulation circuit is coupled to the positive terminal of the feedback amplifier and the charging current setting terminal, and is configured for generating and modulating a thermal regulation voltage with temperature, and outputting the thermal regulation voltage across the positive terminal of the feedback amplifier and the charging current setting terminal.

In some embodiments of the charger circuit, the constant current charging circuit further comprises: a first transistor, a second transistor, a third transistor, and an operational amplifier. The first transistor has the reference current path and a control terminal coupled to the feedback output terminal. The second transistor has the output current path and a control terminal coupled to the feedback output terminal. The third transistor has a load path and a control terminal, wherein the reference current path is coupled to the charge current setting terminal through the load path of the third transistor. The operational amplifier has a negative terminal coupled to the reference current path, a positive terminal coupled to the output current path, and an output terminal coupled to the control terminal of the third transistor.

In some embodiments of the charger circuit, the constant current charging circuit further comprises: a first P-type transistor, a second P-type transistor, a third P-type transistor, and an operational amplifier. The first P-type transistor in the reference current path has a source terminal coupled to the input voltage, a drain terminal, and a gate terminal. The second P-type transistor in the output current path has a source terminal coupled to the input voltage, a drain terminal, and a gate terminal coupled to the gate terminal of the first P-type transistor. The third P-type transistor in the reference current path has a source terminal coupled to the drain terminal of the first P-type transistor, a drain terminal coupled to the charge current setting terminal, and a gate terminal. The operational amplifier has a negative terminal coupled to the source terminal of the third P-type transistor, a positive terminal coupled to the drain terminal of the second P-type transistor, and an output terminal coupled to the gate terminal of the third P-type transistor.

In some embodiments of the charger circuit, the thermal regulation circuit comprises a voltage-to-current converter and a thermal regulation voltage generation circuit. The voltage-to-current converter is configured to generate and modulate a thermal regulation current with temperature according to a temperature sensing voltage and a temperature reference voltage, and has a positive terminal coupled to the temperature sensing voltage, a negative terminal coupled to the temperature reference voltage, and an output terminal to output the thermal regulation current. The thermal regulation voltage generation circuit is arranged to generate the thermal regulation voltage with temperature according to the thermal regulation current, and has a regulation input terminal coupled to the voltage-to-current converter, a first output terminal coupled to the positive terminal of the feedback amplifier, and a second output terminal coupled to the charging current setting terminal.

In some embodiments of the charger circuit, the voltage-to-current converter comprises a transconductance amplifier to receive the temperature sensing voltage and the temperature reference voltage and to output the thermal regulation current based on a difference between the temperature sensing voltage and the temperature reference voltage.

In some embodiments of the charger circuit, the thermal regulation voltage generation circuit comprises a first current source circuit, a second current source circuit, and an output resistor. The first current source circuit is configured for providing current according to the thermal regulation current receiving from the regulation input terminal. The second current source circuit is configured for providing current according to the thermal regulation current receiving from the regulation input terminal. The output resistor is coupled between the first current source circuit and the second current source circuit, wherein the output resistor has two terminals coupled to the first output terminal and the second output terminal respectively, wherein a voltage across the output resistor is generated as the thermal regulation voltage when the current flows from the output resistor.

In some embodiments of the charger circuit, the thermal regulation circuit generates the thermal regulation voltage according to a difference between a temperature sensing voltage and a temperature reference voltage.

In some embodiments of the charger circuit, a voltage at the charge current setting terminal is obtained according to the feedback reference voltage minus the thermal regulation voltage when the temperature sensing voltage is greater than the temperature reference voltage and a temperature indicated by the temperature sensing voltage is less than a shutdown temperature for the charger circuit.

In some embodiments of the charger circuit, when the temperature indicated by the temperature sensing voltage is equal to or greater than a shutdown temperature for the charger circuit, the thermal regulation voltage generated by the thermal regulation circuit is greater than the feedback reference voltage so that the voltage at the charge current setting terminal is zero.

In some embodiments of the charger circuit, when the thermal regulation voltage generated by the thermal regulation circuit is greater than the feedback reference voltage, the feedback amplifier turns off the current mirror and the voltage at the charge current setting terminal is zero so that the current mirror generates no charging current.

In some embodiments of the charger circuit, the charger circuit has a shutdown temperature regardless of a value of the setting resistor coupled to the charge current setting terminal.

DETAILED DESCRIPTION OF THE INVENTION

To facilitate understanding of the object, characteristics, and effects of this present disclosure, embodiments together with the attached drawings for the detailed description of the present disclosure are provided.

Figure 1:
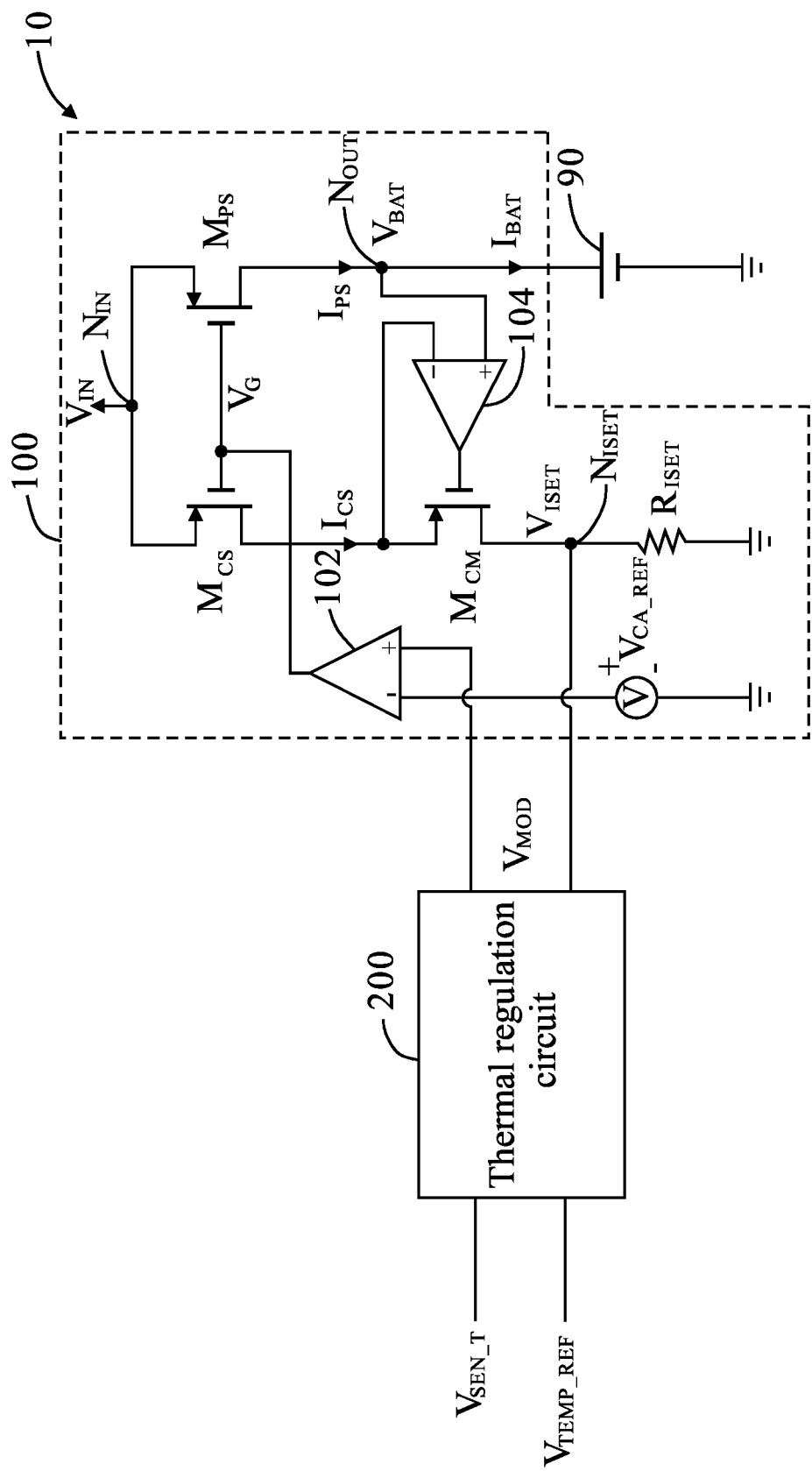
FIG. 1 is a drawing illustrating a charger circuit with thermal regulation according to an embodiment of the present invention.

Referring to FIG. 1, a charger circuit 10 with thermal regulation is illustrated according to an embodiment of the present invention. As shown in FIG. 1, the charger circuit 10 comprises a constant current charging circuit 100 and a thermal regulation circuit 200.

The constant current charging circuit 100 is configured for generating a charging current for charging a battery 90. The constant current charging circuit 100 includes a charger input terminal $N_{IN}$ for receiving an input voltage $V_{IN}$, a charge current setting terminal $N_{ISET}$ for being coupled to a setting resistor $R_{ISET}$, a charger output terminal $N_{OUT}$ for outputting the charging current $I_{PS}$, a current mirror (e.g., formed by using two or more transistors) including a reference current path for a reference current $I_{CS}$ and an output current path for the charging current $I_{PS}$, and a feedback amplifier 102 having a positive terminal (e.g., denoted by "+"), a negative terminal (e.g., denoted by "−") for receiving a feedback reference voltage $V_{CA\_REF}$, and a feedback output terminal coupled to the current mirror to control the current mirror. The reference current path is coupled between the charger input terminal $N_{IN}$ and the charge current setting terminal $N_{ISET}$ and the output current path is coupled between the charger input terminal $N_{IN}$ and the charger output terminal $N_{OUT}$.

In practice, the charger circuit 10 is implemented by a linear charger circuit, and may further include a constant voltage charging circuit (not shown). In this manner, the battery 90 is charged with a battery voltage $V_{BAT}$ and a battery current $I_{BAT}$. Since the present invention focuses on the thermal regulation design for the constant current charging circuit, the constant voltage charging circuit will not be described for brevity.

In some embodiments of the charger circuit 10, the constant current charging circuit 100 further comprises: a first transistor $M_{CS}$, a second transistor $M_{PS}$, a third transistor $M_{CM}$, and an operational amplifier 104. The first transistor $M_{CS}$ is disposed in the reference current path. The second transistor $M_{PS}$ is disposed in the output current path. A control terminal of the first transistor $M_{CS}$ and a control terminal of the second transistor are coupled to the feedback output terminal. The third transistor $M_{CM}$ is disposed in the reference current path and coupled between the first transistor $M_{CS}$ and the charge current setting terminal $N_{ISET}$. The operational amplifier 104 has a negative terminal coupled to the reference current path, a positive terminal coupled to the output current path, and an output terminal coupled to the control terminal of the third transistor $M_{CM}$.

For example, as illustrated in FIG. 1, the first transistor $M_{CS}$ is implemented by using a first P-type transistor such as a PMOS transistor in the reference current path, and the first transistor $M_{CS}$ has its source terminal coupled to the input voltage $V_{IN}$ (or charger input terminal $N_{IN}$), its drain terminal in the reference current path, and its gate terminal as the control terminal of the first transistor $M_{CS}$. For example, as illustrated in FIG. 1, the second transistor $M_{PS}$ is implemented by using a second P-type transistor such as a PMOS transistor in the output current path, and the second transistor $M_{PS}$ has its source terminal coupled to the input voltage $V_{IN}$ (or charger input terminal $N_{IN}$), its drain terminal in the output current path, and its gate terminal as the control terminal of the second transistor $M_{PS}$ coupled to the control terminal of the first transistor $M_{CS}$. For example, as illustrated in FIG. 1, the third transistor $M_{CM}$ is implemented by using a third P-type transistor such as a PMOS transistor in the reference current path, and the third transistor $M_{CM}$ has its source terminal coupled to the drain terminal of the first transistor $M_{CS}$, its drain terminal coupled to the charge current setting terminal $N_{ISET}$, and its gate terminal. For example, the operational amplifier 104 has a negative terminal coupled to the source terminal of the third transistor $M_{CM}$, a positive terminal coupled to the drain terminal of the second transistor $M_{PS}$, and an output terminal coupled to the gate terminal of the third transistor $M_{CM}$.

As shown in FIG. 1, the thermal regulation circuit 200 is coupled to the positive terminal of the feedback amplifier 102 and the charging current setting terminal $N_{ISET}$, and is configured for generating and modulating a thermal regulation voltage $V_{MOD}$ with temperature, and outputting the thermal regulation voltage $V_{MOD}$ across the positive terminal of the feedback amplifier 102 and the charging current setting terminal $N_{ISET}$. In addition, the thermal regulation circuit 200 may be implemented to receive a temperature sensing voltage $V_{SEN\_T}$ and a temperature reference voltage $V_{TEMP\_REF}$, and modulate the thermal regulation voltage $V_{MOD}$ according to the temperature sensing voltage $V_{SEN\_T}$ and the temperature reference voltage $V_{TEMP\_REF}$, wherein the temperature reference voltage $V_{TEMP\_REF}$ is approached to the zero-temperature coefficient reference voltage, and the temperature sensing voltage $V_{SEN\_T}$ is a temperature-dependent voltage. For example, the temperature sensing voltage $V_{SEN\_T}$ increases as the temperature rises, and decreases as the temperature falls, wherein the temperature may indicate the ambient temperature of the charger circuit.

With respect to the positive and negative terminal of the feedback amplifier 102, the voltage at the positive terminal (e.g., sum of a voltage at the charge current setting terminal $N_{ISET}$ and the thermal regulation voltage $V_{MOD}$) and the voltage at the negative terminal (e.g., the feedback reference voltage $V_{CA\_REF}$) are equal approximately, as indicated by the following equation (denoted by Eq. 1):

$$V_{ISET} + \Delta V \approx V_{CA\_REF},$$

wherein $V_{ISET}$ is a setting voltage at the charge current setting terminal $N_{ISET}$ and $V_{MOD}$ is denoted as $\Delta V$. The above equation can be expressed as the following equation (denoted by Eq. 2):

$$V_{ISET} \approx V_{CA\_REF} - \Delta V.$$

According to the above equation, the setting voltage $V_{ISET}$ at the charge current setting terminal $N_{ISET}$ can be decreased or reduced to zero by way of modulation of the thermal regulation voltage $V_{MOD}$ with the temperature. The reference current $I_{CS}$ and the charging current $I_{PS}$ can then be decreased or reduced to zero as well.

Accordingly, the thermal regulation circuit 200 may be implemented to generate and modulate the thermal regulation voltage $V_{MOD}$ according to the temperature sensing voltage $V_{SEN\_T}$ and the temperature reference voltage $V_{TEMP\_REF}$ so that the setting voltage $V_{ISET}$ can be reduced from the voltage level of the feedback reference voltage $V_{CA\_REF}$ when the temperature arises and can be reduced to zero at a stable shutdown temperature as required.

Figure 2:
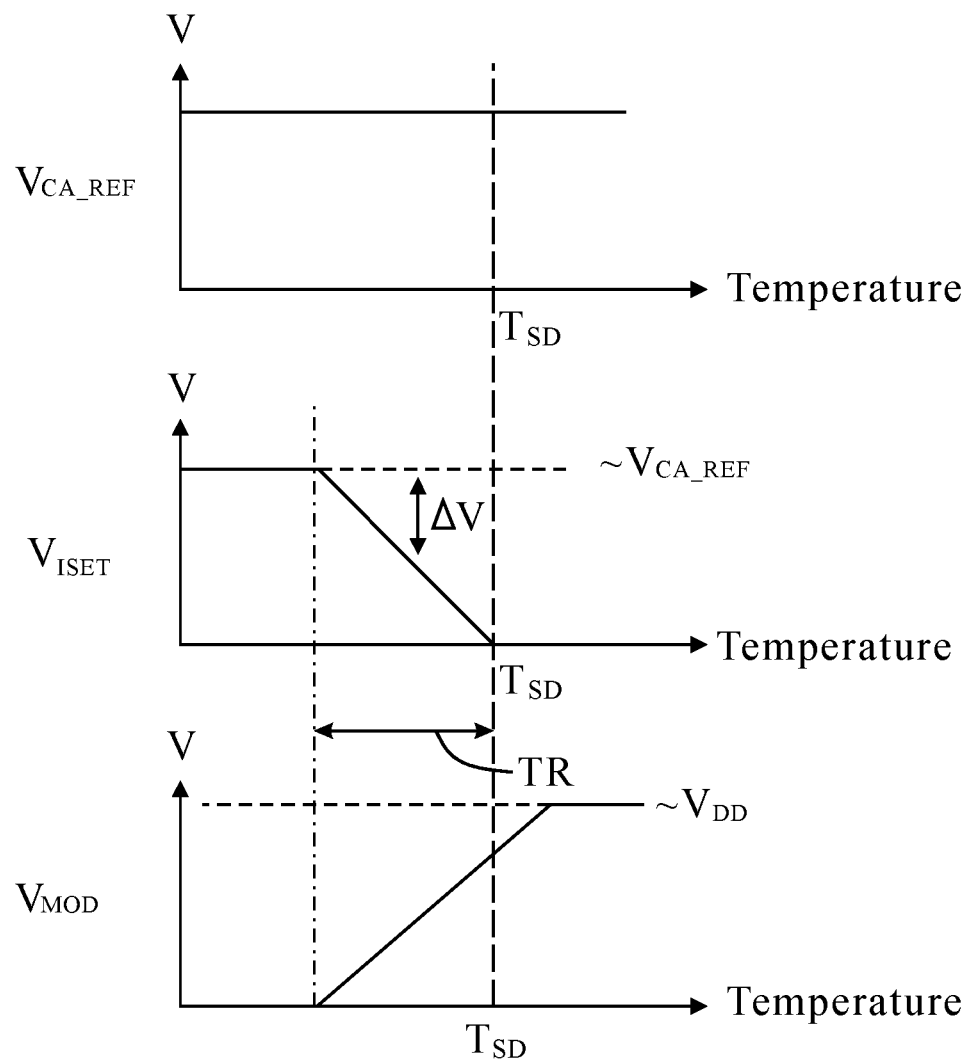
FIG. 2 is a drawing illustrating thermal modulation of a voltage of the charger circuit of FIG. 1 according to an embodiment of the present invention.

Referring to FIG. 2, thermal modulation of the thermal regulation voltage $V_{MOD}$ of the charger circuit of FIG. 1 is illustrated according to an embodiment of the present invention. As shown in FIG. 2, the relationship of the feedback reference voltage $V_{CA\_REF}$, the setting voltage $V_{ISET}$, and thermal regulation voltage $V_{MOD}$ (or also denoted as $\Delta V$) with respect to the temperature are illustrated. When the temperature is less than a temperature range TR with respect to a shutdown temperature $T_{SD}$, the thermal regulation voltage $V_{MOD}$ (or denoted as $\Delta V$) is zero and the setting voltage $V_{ISET}$ is equal to the feedback reference voltage $V_{CA\_REF}$ approximately. As the temperature arises and enters the temperature range TR, the thermal regulation voltage $V_{MOD}$ begins to increase from zero and the setting voltage $V_{ISET}$ starts to decrease. When the temperature is equal to the shutdown temperature $T_{SD}$, the setting voltage $V_{ISET}$ is equal to zero. When the temperature is greater than the shutdown temperature $T_{SD}$, the setting voltage $V_{ISET}$ retains zero and the feedback amplifier 102 outputs an output voltage (e.g., a high-level voltage) to turn off the first transistor $M_{CS}$ and the second transistor $M_{PS}$. In this manner, the reference current $I_{CS}$ and the charging current $I_{PS}$ can be reduced to zero at the shutdown temperature stably as required.

In order to achieve a stable shutdown temperature, the thermal regulation circuit 200 can be implemented to generate and modulate the thermal regulation voltage $V_{MOD}$ according to the voltage relationship as illustrated in FIG. 2 in various manners. The following illustrates some embodiments of the thermal regulation circuit 200.

Figure 3:
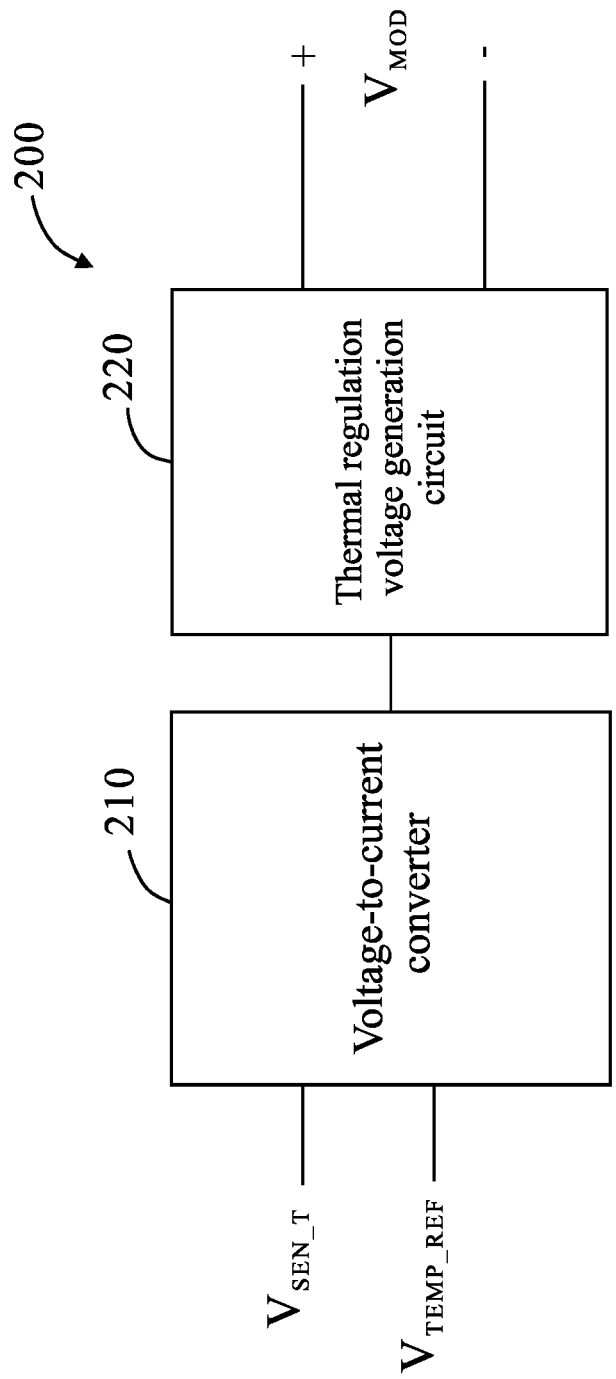
FIG. 3 is a drawing illustrating architecture of a thermal regulation circuit according to some embodiments of the present invention.

Referring to FIG. 3, architecture of the thermal regulation circuit 200 is illustrated according to some embodiments of the present invention. In some embodiments, the thermal regulation circuit 200 comprises a voltage-to-current converter 210 and a thermal regulation voltage generation circuit 220. The voltage-to-current converter 210 is configured to generate and modulate a thermal regulation current with temperature according to a temperature sensing voltage $V_{SEN\_T}$ and a temperature reference voltage $V_{TEMP\_REF}$, and has a positive terminal coupled to the temperature sensing voltage $V_{SEN\_T}$, a negative terminal coupled to the temperature reference voltage $V_{TEMP\_REF}$, and an output terminal to output the thermal regulation current. The thermal regulation voltage generation circuit 220 is arranged to generate the thermal regulation voltage $V_{MOD}$ with temperature according to the thermal regulation current, and has a regulation input terminal coupled to the voltage-to-current converter 210, a first output terminal, and a second output terminal. The thermal regulation voltage generation circuit 220 outputs the thermal regulation voltage $V_{MOD}$ through the first output terminal and the second output terminal. The first output terminal and the second output terminal of the thermal regulation voltage generation circuit 220 are served as output terminals of the thermal regulation circuit 200 and are coupled to the positive terminal of the feedback amplifier 102 and the charging current setting terminal $N_{ISET}$, respectively.

In some embodiments of the charger circuit based on FIG. 1 or FIG. 3, the thermal regulation circuit 200 generates the thermal regulation voltage $V_{MOD}$ according to a difference between the temperature sensing voltage $V_{SEN\_T}$ and the temperature reference voltage $V_{TEMP\_REF}$.

In some embodiments of the charger circuit based on FIG. 1 or FIG. 3, the setting voltage $V_{ISET}$ at the charge current setting terminal $N_{ISET}$ is obtained according to the feedback reference voltage $V_{CA\_REF}$ minus the thermal regulation voltage $V_{MOD}$ when the temperature sensing voltage $V_{SEN\_T}$ is greater than the temperature reference voltage $V_{TEMP\_REF}$ and a temperature indicated by the temperature sensing voltage $V_{SEN\_T}$ is less than a shutdown temperature $T_{SD}$ for the charger circuit.

In some embodiments of the charger circuit based on FIG. 1 or FIG. 3, when the temperature indicated by the temperature sensing voltage $V_{SEN\_T}$ is equal to or greater than a shutdown temperature $T_{SD}$ for the charger circuit 10, the thermal regulation voltage $V_{MOD}$ generated by the thermal regulation circuit 200 is greater than the feedback reference voltage $V_{CA\_REF}$ so that the setting voltage $V_{ISET}$ at the charge current setting terminal $N_{ISET}$ is zero.

In some embodiments of the charger circuit based on FIG. 1 or FIG. 3, when the thermal regulation voltage $V_{MOD}$ generated by the thermal regulation circuit 200 is greater than the feedback reference voltage $V_{CA\_REF}$, the feedback amplifier 102 turns off the current mirror of the constant current charging circuit 100 and the setting voltage $V_{ISET}$ at the charge current setting terminal $N_{ISET}$ is zero so that the current mirror generates no charging current.

In some embodiments of the charger circuit based on FIG. 1 or FIG. 3, the charger circuit 10 has a shutdown temperature regardless of the value of the setting resistor $R_{ISET}$ coupled to the charge current setting terminal $N_{ISET}$.

Figure 4:
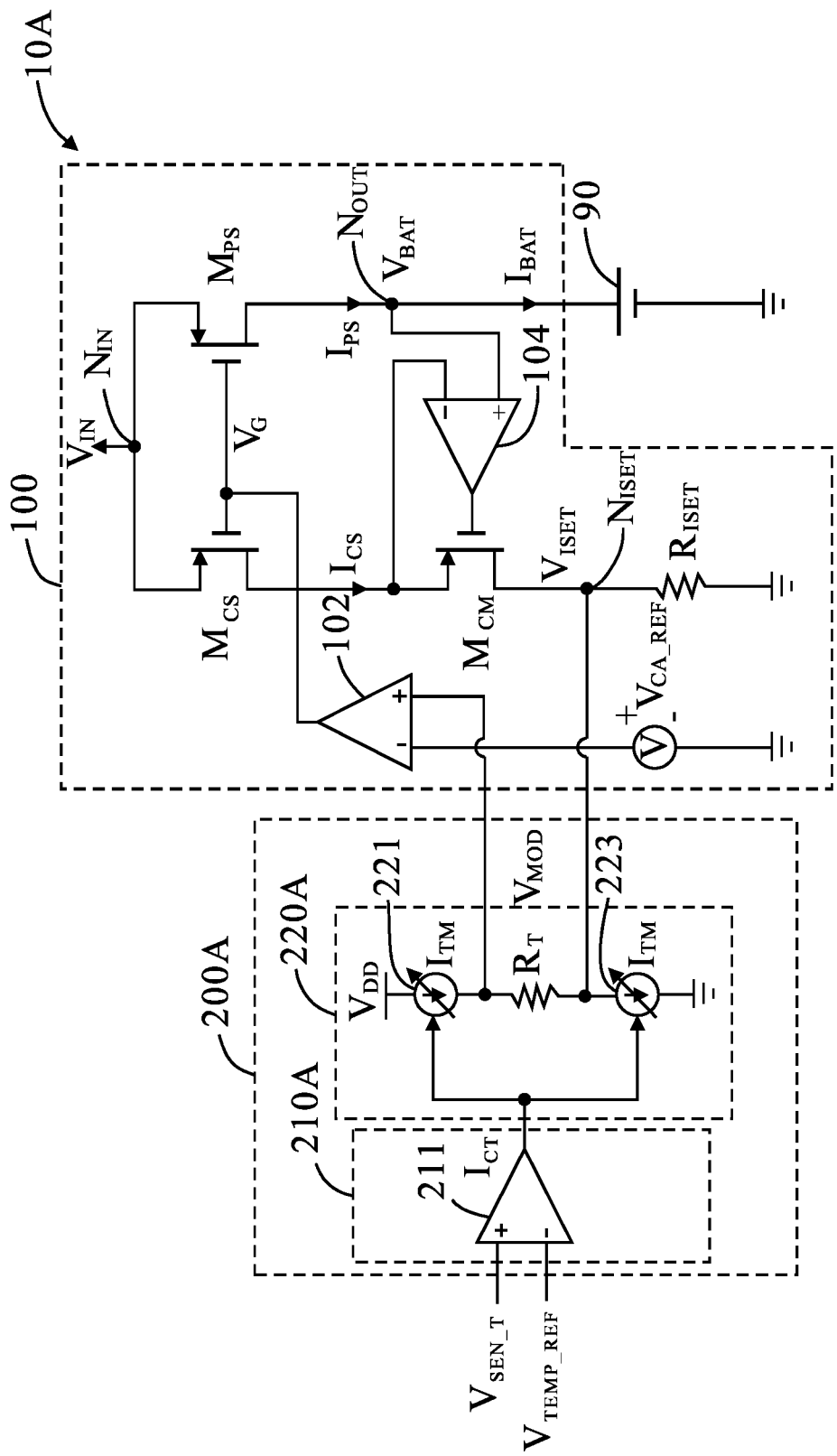
FIG. 4 is a drawing illustrating a charger circuit with thermal regulation based on FIGS. 1 and 3 according to an embodiment of the present invention.

Referring to FIG. 4, a charger circuit 10A with thermal regulation based on FIGS. 1 and 3 is illustrated according to an embodiment of the present invention. In FIG. 4, the charger circuit 10A includes the constant current charging circuit 100 as illustrated in FIG. 1 and a thermal regulation circuit 200A based on the architecture shown in FIG. 3. The thermal regulation circuit 200A comprises a voltage-to-current converter 210A and a thermal regulation voltage generation circuit 220A.

As shown in FIG. 4, the voltage-to-current converter 210A comprises a transconductance amplifier 211 to receive the temperature sensing voltage $V_{SEN\_T}$ and the temperature reference voltage $V_{TEMP\_REF}$ and to output a thermal regulation current $I_{CT}$. For example, the transconductance amplifier 211 can be configured to output the thermal regulation current $I_{CT}$ based on a gain (e.g., denoted by $G_{TM}$) of the transconductance amplifier 211 multiplied by a difference between the temperature sensing voltage $V_{SEN\_T}$ and the temperature reference voltage $V_{TEMP\_REF}$ when the temperature sensing voltage $V_{SEN\_T}$ is greater than the temperature reference voltage $V_{TEMP\_REF}$. The thermal regulation current $I_{CT}$ can be indicated by the following equation (denoted by Eq. 3):

$$I_{CT}=(V_{SEN\_T}-V_{TEMP\_REF})G_{TM}.$$

Conversely, when the temperature sensing voltage $V_{SEN\_T}$ is less than or equal to the temperature reference voltage $V_{TEMP\_REF}$, the thermal regulation current $I_{CT}$ is zero or has a small value that can be ignored.

The thermal regulation voltage generation circuit 220A comprises a first current source circuit 221, a second current source circuit 223, and an output resistor $R_T$. The first current source circuit 221 is configured for providing current according to the thermal regulation current $I_{CT}$ received from the regulation input terminal. For example, the first current source circuit 221 is a current-controlled current source which is coupled between a first reference voltage (e.g., a supply voltage $V_{DD}$) and the first output terminal of the thermal regulation voltage generation circuit 220A and is controlled according to the thermal regulation current $I_{CT}$. The second current source circuit 223 is configured for providing current according to the thermal regulation current $I_{CT}$ receiving from the regulation input terminal. For example, the second current source circuit 223 is a current-controlled current source which is coupled between the second output terminal of the thermal regulation voltage generation circuit 220A and a second reference voltage (e.g., a ground voltage) and is controlled according to the thermal regulation current $I_{CT}$. The output resistor $R_T$ is coupled between the first current source circuit 221 and the second current source circuit 223. For example, the output resistor $R_T$ has two terminals coupled to the first output terminal and the second output terminal of the thermal regulation voltage generation circuit 220A, respectively. The first output terminal and the second output terminal of the thermal regulation voltage generation circuit 220A are served as output terminals of the thermal regulation circuit 200A and are coupled to the positive terminal of the feedback amplifier 102 and the charging current setting terminal $N_{ISET}$, respectively. As such, the voltage across the output resistor $R_T$ is generated as the thermal regulation voltage $V_{MOD}$ when the current (e.g., denoted by $I_{TM}$) flows from the output resistor $R_T$.

For the sake of illustration, it is supposed in an example that the first current source circuit 221 and the second current source circuit 223 generate the same current by the thermal regulation current $I_{CT}$, the thermal regulation voltage $V_{MOD}$ can be expressed by the following equation (denoted by Eq. 4) according to the equation Eq. 3:

$$V_{MOD}=(V_{SEN\_T}-V_{TEMP\_REF})G_{TM}R_T.$$

By way of the equations Eq. 2 and Eq. 4, the setting voltage $V_{ISET}$ at the charge current setting terminal $N_{ISET}$ and its corresponding reference current $I_{CS}$ (which the charging current $I_{PS}$ mirrors) when the temperature is less than a shutdown temperature for this example can be expressed by the following equations (Eq. 5, Eq. 6):

$$V_{ISET}=V_{CA\_REF}-(V_{SEN\_T}-V_{TEMP\_REF})G_{TM}R_T;$$

$$I_{CS}=V_{ISET}/R_{ISET}.$$

The above equations Eq. 5 and Eq. 6 indicate that when the temperature sensing voltage $V_{SEN\_T}$ is greater than the temperature reference voltage $V_{TEMP\_REF}$, the setting voltage $V_{ISET}$ at the charge current setting terminal $N_{ISET}$ can be modulated according to temperature in a linear manner provided that the temperature is less than a shutdown temperature for the charger circuit 10A. In addition, the setting voltage $V_{ISET}$ can be set to zero for the design requirements of the charger circuit 10A when the temperature is equal to or greater than the shutdown temperature for the charger circuit 10A. For example, the parameter values $V_{CA\_REF}$, $V_{SEN\_T}$, $V_{TEMP\_REF}$, $G_{TM}$, and $R_T$ can be designed according to the equations Eq. 5 and Eq. 6 to achieve the modulation and the stable shutdown temperature for the design requirements of the charger circuit 10A. For example, the charger circuit 10A can be configured to modulate the charging current $I_{PS}$ with temperature and can operate according to the voltage relationship as illustrated in FIG. 2. Accordingly, the thermal regulation for a stable shutdown temperature can be achieved regardless of the different value of the setting resistor, and the circuit complexity of control architecture of the thermal regulation is reduced.

Figure 5:
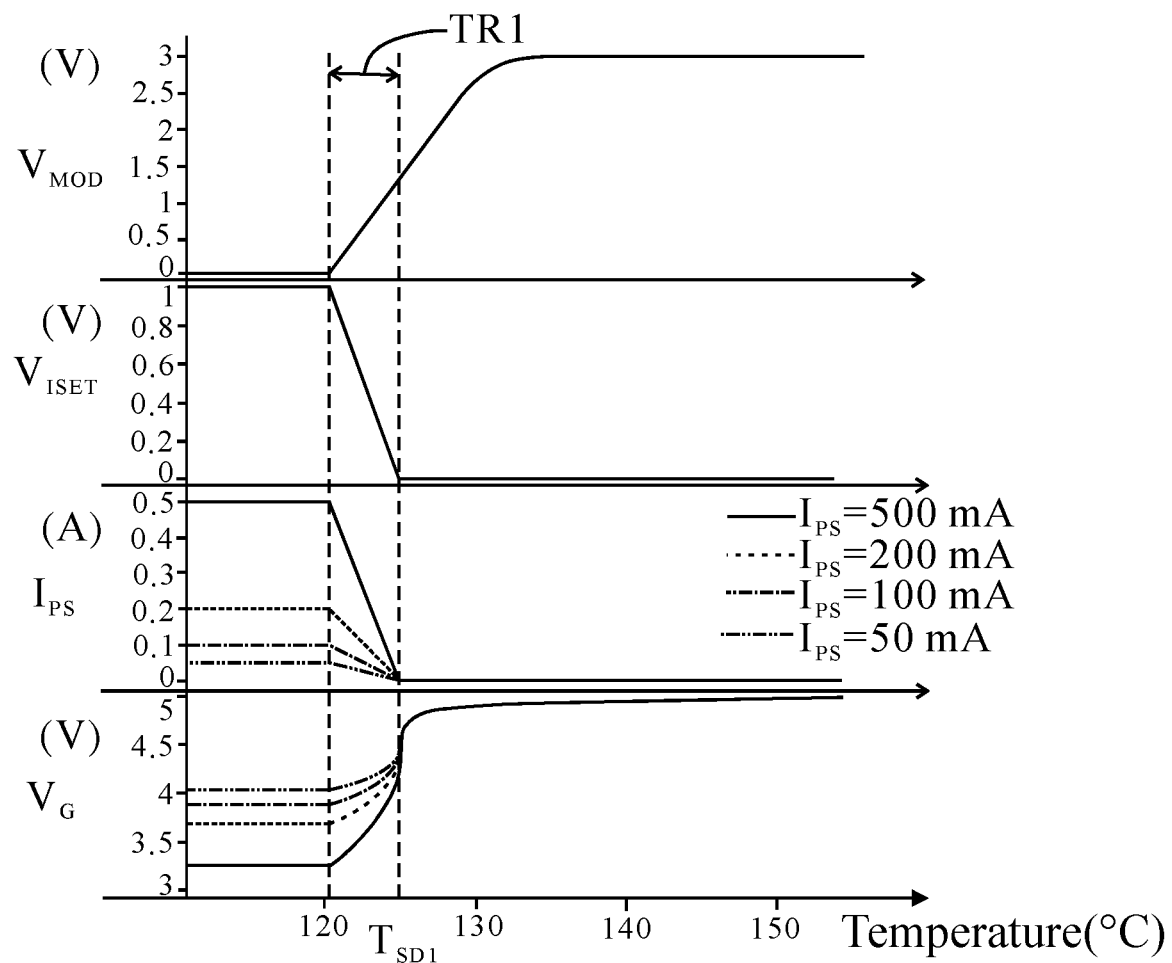
FIG. 5 is a drawing illustrating examples of thermal modulation of associated voltage and current of the charger circuit shown in FIG. 4 according to embodiments of the present invention.

Referring to FIG. 5, examples of thermal modulation of associated voltage and current of the charger circuit 10A shown in FIG. 4 are illustrated according to some embodiments of the present invention. It is supposed that the charger input terminal $N_{IN}$ is coupled to the input voltage $V_{IN}$ of 5 V. As shown in FIG. 5, by using modulation of the thermal regulation voltage $V_{MOD}$ with temperature, the modulation of the setting voltage $V_{ISET}$ with temperature becomes linear as the temperature is within a temperature range TR1, which facilitates the modulation of the charging current $I_{PS}$ with temperature, and the modulation of the charging current $I_{PS}$ with temperature is also linear as the temperature is within the temperature range TR1. In addition, a shutdown temperature $T_{SD1}$ of the charger circuit 10A can be stable and remains unchanged when the charging current $I_{PS}$ is configured to have different initial current values (e.g. 500 mA, 200 mA, 100 mA, and 50 mA) by using the setting resistor $R_{ISET}$ with different resistance values. That is, the shutdown temperature of the charger circuit 10A is unchanged regardless of the different resistance value of the setting resistor $R_{ISET}$. For different gate voltages $V_G$ corresponding to different initial current values (e.g. 500 mA, 200 mA, 100 mA, and 50 mA) of the charging current $I_{PS}$, the current mirror (or regarded as a power stage) of the charger circuit 10A is to be turned off at a higher temperature above the shutdown temperature (e.g., the gate voltage $V_G$ is approximately equal to the input voltage $V_{IN}$ at a high temperature), resulting in the charging current $I_{PS}$ of zero value.

In some embodiments, the charging circuit (e.g., FIG. 1, 4, or any example above) can have its constant current charging circuit with other configurations or implementations. For example, the reference current path and the output current path of the constant current charging circuit can be implemented to include transistors of other types of transistors or implemented by using different types of transistors (such as N-type transistors; or both P-type and N-type transistors), and the thermal regulation circuit can thus be modified or configured (e.g., as shown in FIG. 3) to meet the voltage relationship as illustrated above (e.g., FIG. 2 or examples based on FIG. 2) whenever appropriate.

In other embodiments, the charger circuit, for example, according to that of FIG. 1, 4, or any example above, can be implemented as a chip or inside a chip for use in charging an energy storage device such as a battery. For example, the chip may include the setting resistor $R_{ISET}$ or a circuit for providing the feedback reference voltage $V_{CA\_REF}$ (e.g., implemented by a voltage source), or both of them. In some examples, the chip can be implemented with specific terminal(s), such as a terminal connected to the charge current setting terminal $N_{ISET}$ and/or a terminal connected to the negative terminal of the feedback amplifier 102. In this manner, the chip can exclude the setting resistor $R_{ISET}$ or the circuit for providing the feedback reference voltage $V_{CA\_REF}$, or both of them, being environmental or external element(s) to be coupled to the corresponding terminals of the chip.

While the present disclosure has been described by means of various embodiments, numerous modifications and variations could be made thereto by those skilled in the art without departing from the scope and spirit of the present disclosure set forth in the claims.

What is claimed is:

1. A charger circuit, comprising:
    a constant current charging circuit for generating a charging current, including a charger input terminal for receiving an input voltage, a charge current setting terminal, a charger output terminal for outputting the charging current, a current mirror including a reference current path between the charger input terminal and the charge current setting terminal and including an output current path between the charger input terminal and the charger output terminal, and a feedback amplifier having a positive terminal, a negative terminal for receiving a feedback reference voltage, and a feedback output terminal coupled to the current mirror; and
    a thermal regulation circuit coupled to the positive terminal of the feedback amplifier and the charging current setting terminal, for generating and modulating a thermal regulation voltage with temperature, and outputting the thermal regulation voltage across the positive terminal of the feedback amplifier and the charging current setting terminal.

2. The charger circuit according to claim 1, wherein the constant current charging circuit further comprises:
    a first transistor disposed in the reference current path;
    a second transistor disposed in the output current path, wherein a control terminal of the first transistor and a control terminal of the second transistor are coupled to the feedback output terminal;
    a third transistor disposed in the reference current path and coupled between the first transistor and the charge current setting terminal; and
    an operational amplifier having a negative terminal coupled to the reference current path, a positive terminal coupled to the output current path, and an output terminal coupled to a control terminal of the third transistor.

3. The charger circuit according to claim 1, wherein the constant current charging circuit further comprises:
    a first P-type transistor in the reference current path, wherein a source terminal of the first P-type transistor is coupled to the input voltage;
    a second P-type transistor in the output current path, wherein a source terminal of the second P-type transistor is coupled to the input voltage, a drain terminal of the second P-type transistor is coupled to the charger output terminal, and a gate terminal of the second P-type transistor is coupled to a gate terminal of the first P-type transistor;
    a third P-type transistor in the reference current path, wherein a source terminal of the third P-type transistor is coupled to a drain terminal of the first P-type transistor, a drain terminal of the third P-type transistor is coupled to the charge current setting terminal; and
    an operational amplifier having a negative terminal coupled to the source terminal of the third P-type transistor, a positive terminal coupled to the drain terminal of the second P-type transistor, and an output terminal coupled to a gate terminal of the third P-type transistor.

4. The charger circuit according to claim 1, wherein the thermal regulation circuit comprises:
    a voltage-to-current converter configured to generate and modulate a thermal regulation current with temperature according to a temperature sensing voltage and a temperature reference voltage, and having a positive terminal coupled to the temperature sensing voltage, a negative terminal coupled to the temperature reference voltage, and an output terminal to output the thermal regulation current; and
    a thermal regulation voltage generation circuit configured to generate the thermal regulation voltage with temperature according to the thermal regulation current, and having a regulation input terminal coupled to the voltage-to-current converter, a first output terminal coupled to the positive terminal of the feedback amplifier, and a second output terminal coupled to the charging current setting terminal.

5. The charger circuit according to claim 4, wherein the voltage-to-current converter comprises a transconductance amplifier for receiving the temperature sensing voltage and the temperature reference voltage and outputting the thermal regulation current based on a difference between the temperature sensing voltage and the temperature reference voltage.

6. The charger circuit according to claim 4, wherein the thermal regulation voltage generation circuit comprises:
    a first current source circuit for providing current according to the thermal regulation current receiving from the regulation input terminal;
    a second current source circuit for providing current according to the thermal regulation current receiving from the regulation input terminal; and an output resistor coupled between the first current source circuit and the second current source circuit, wherein the output resistor has two terminals coupled to the first output terminal and the second output terminal respectively, wherein a voltage across the output resistor is generated as the thermal regulation voltage when the current flows from the output resistor.

7. The charger circuit according to claim 1, wherein the thermal regulation circuit generates the thermal regulation voltage according to a difference between a temperature sensing voltage and a temperature reference voltage.

8. The charger circuit according to claim 7, wherein a voltage at the charge current setting terminal is obtained according to the feedback reference voltage minus the thermal regulation voltage when the temperature sensing voltage is greater than the temperature reference voltage and a temperature indicated by the temperature sensing voltage is less than a shutdown temperature for the charger circuit.

9. The charger circuit according to claim 7, wherein when the temperature indicated by the temperature sensing voltage is equal to or greater than a shutdown temperature for the charger circuit, the thermal regulation voltage generated by the thermal regulation circuit is greater than the feedback reference voltage so that the voltage at the charge current setting terminal is zero.

10. The charger circuit according to claim 7, wherein when the thermal regulation voltage generated by the thermal regulation circuit is greater than the feedback reference voltage, the feedback amplifier turns off the current mirror and the voltage at the charge current setting terminal is zero so that the current mirror generates no charging current.

11. The charger circuit according to claim 7, wherein the charger circuit has a shutdown temperature regardless of a value of a setting resistor coupled to the charge current setting terminal.

* * * * *